US007697497B2

(12) United States Patent
Grube et al.

(10) Patent No.: US 7,697,497 B2
(45) Date of Patent: Apr. 13, 2010

(54) METHOD AND APPARATUS FOR USING MULTIPLE TRANSMISSION STATES WHILE MAINTAINING QUALITY OF SERVICE

(75) Inventors: Gary W. Grube, Barrington, IL (US); Robert D. Kubik, Burke, VA (US)

(73) Assignee: Motorola, Inc., Schaumburg, IL (US)

( * ) Notice: Subject to any disclaimer, the term of this patent is extended or adjusted under 35 U.S.C. 154(b) by 690 days.

(21) Appl. No.: 11/536,216

(22) Filed: Sep. 28, 2006

(65) Prior Publication Data
US 2008/0080447 A1 Apr. 3, 2008

(51) Int. Cl.
*H04B 7/216* (2006.01)
(52) U.S. Cl. .................. 370/342; 370/400; 370/236; 370/255; 340/572.2; 340/572.4; 340/568.1; 340/539.11
(58) Field of Classification Search ............ 340/572.2, 340/572.4, 568.1, 539.11; 370/236, 255, 370/342, 400
See application file for complete search history.

(56) References Cited

U.S. PATENT DOCUMENTS

| 7,026,935 | B2 * | 4/2006 | Diorio et al. ............ 340/572.2 |
| 7,065,326 | B2 | 6/2006 | Lovberg et al. |
| 7,414,985 | B1 * | 8/2008 | Tedijanto et al. .......... 370/255 |
| 7,417,548 | B2 * | 8/2008 | Kavounas et al. ........ 340/572.2 |
| 7,430,257 | B1 * | 9/2008 | Shattil ........................ 375/347 |
| 2006/0261956 | A1 * | 11/2006 | Sundstrom et al. ....... 340/572.2 |
| 2007/0109129 | A1 * | 5/2007 | Sundstrom et al. ....... 340/572.2 |

OTHER PUBLICATIONS

Blaine R. Copenheaver, "PCT/US2007/075147—PCT International Search Report and Written Opinion," WIPO, ISA/US, Commissioner for Patents, Alexandria, VA, USA, Jan. 28, 2008.
Athina Nickitas-Etienne, "PCT/US2007/075147—PCT International Preliminary Report on Patentability," The International Bureau of WIPO, Geneva, Switzerland, Apr. 9, 2009.

* cited by examiner

*Primary Examiner*—Vincent P Harper
*Assistant Examiner*—Khalid Shaheed

(57) ABSTRACT

A wireless transmitter (400) having a quantity of data to transmit (101) can automatically determine (102) whether that data can be transmitted using a first transmission state in a manner that complies with regulatory requirements as will apply to such a transmission state. When true, these teachings can provide for automatically transmitting (108) that data using that first transmission state. When not true, however, these teachings will then provide for automatically determining (103) whether this data can be transmitted using a second transmission state in a manner that is appropriately compliant with the salient regulatory requirements. By one approach, this second transmission state is at least partially different from the first transmission state but offers a substantially comparable quality of service. When true, these teachings then provide for transmission (105) of that data using this second transmission state.

9 Claims, 3 Drawing Sheets

METHOD AND APPARATUS FOR USING MULTIPLE TRANSMISSION STATES WHILE MAINTAINING QUALITY OF SERVICE

TECHNICAL FIELD

This invention relates generally to wireless communications and more particularly to facilitating transmissions of data in compliance with regulatory requirements.

BACKGROUND

Wireless transmission technologies of various kinds are known in the art. Such technologies use a variety of modulation, transmission, bearer channel construct and frequency (s), and/or protocol approaches to effect the transmission of user and/or system content. In general, however, from country to country around the world, essentially all such transmissions share a common requirement; compliance with one or more regulatory requirements. These regulatory requirements may be general or specific but tend to exist to ensure that the transmission does not unduly interfere with other transmissions.

There are various ways that regulatory bodies express these requirements. For example, restrictions and limitations may be set forth regarding specific center frequencies, channel width, guard bands, maximum transmission power, and so forth, to note but a few examples in this regard. One way or the other, however, these requirements tend to be viewable as establishing limitations regarding the spectral density of a given transmission at a given center frequency. Such limitations can be viewed as a spectral density mask, such that when the spectral density signature of a given transmission exceeds the bounds of this spectral density mask, that transmission can be viewed as also exceeding the bounds of the corresponding regulatory requirements.

Radio designers typically account for such regulatory requirements in the basic design of their platforms. A given radio, designed to operate in a particular manner, is configured and arranged to simply not exceed relevant regulatory requirements during ordinary use. More recently, so-called cognitive radios are able to adjust their operability, often in significant ways, during ordinary use. Such cognitive radios may then be imbued with a capability of determining whether a given state of operation is in compliance with relevant regulatory requirements. When such is not the case, such a platform can then be configured to either simply prohibit any further operation or to downgrade the quality of service in order to ensure a compliant transmission. Reducing transmission power comprises a simple example as to the latter.

Such solutions leave much to be desired. In many cases the transmission states of a cognitive radio occur with relative transparency; the user will typically not know (or perhaps even care) how their radio is presently operating. A diminution with respect to quality of service, however, can be very evident. Any reduction in quality of service can be noticeable to a user and comprise a highly undesired condition. Dissatisfaction can be higher when the reasons for such a reduction are unapparent to the user and appear to be, more or less, random in nature.

BRIEF DESCRIPTION OF THE DRAWINGS

The above needs are at least partially met through provision of the method and apparatus for using multiple transmission states while maintaining quality of service described in the following detailed description, particularly when studied in conjunction with the drawings, wherein.

Figure 1:
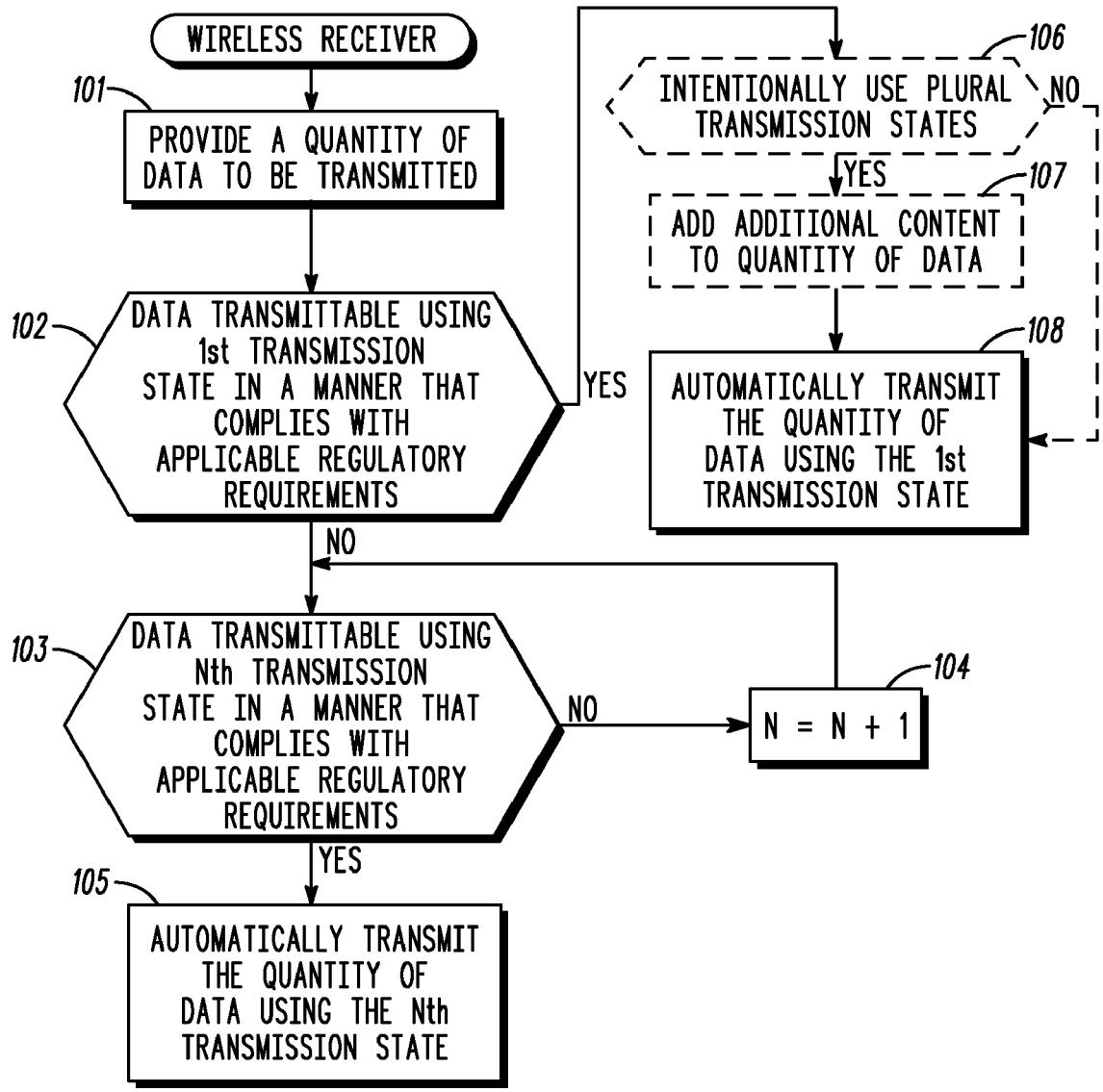
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a wireless transmitter having a quantity of data to transmit can automatically determine whether that data can be transmitted using a first transmission state in a manner that complies with regulatory requirements as will apply to such a transmission state. When true, these teachings can provide for automatically transmitting that data using that first transmission state. When not true, however, these teachings will then provide for automatically determining whether this data can be transmitted using a second transmission state in a manner that is appropriately compliant with the salient regulatory requirements. By one approach, this second transmission state is at least partially different from the first transmission state but offers a substantially comparable quality of service. When true, these teachings then provide for transmission of that data using this second transmission state.

By one approach, this process can incrementally repeat as necessary in order to finally identify a transmission state that will support transmission of the data in a manner that offers at least a substantially comparable quality of service. If desired, this can comprise dis-aggregating the data amongst a plurality of temporally parallel transmission streams. In such a case, the receiving platform can then re-aggregate the data in order to recover the data in a usable format.

So configured, a transmission-agile wireless transmitter platform can readily effect (in as transparent manner as may be desired) a wireless transmission of data in a manner that will comply with relevant regulatory requirements. This, in turn, can greatly increase the value and usability of a cognitive radio platform. Those skilled in the art will recognize and appreciate that these teachings are readily implementable in a cost effective manner and are readily scalable to accommodate and/or leverage the limitations and/or capabilities of a given wireless platform.

These and other benefits may become clearer upon making a thorough review and study of the following detailed description. Referring now to the drawings, and in particular to FIG. 1, an illustrative process 100 usable in conjunction with a wireless transmitter of choice begins with the provision 101 of a quantity of data to be transmitted. Such data may comprise real-time content (such as real-time voice, streaming data, or the like) or may comprise a bulk transfer (such as a bulk transfer of a text file, an audio file, an audiovisual file, or the like). This process 100 then provides for automatically determining 102 whether this quantity of data can be transmitted using a first transmission state in a manner that complies with regulatory requirements as will apply to such a first transmission state transmission. This can comprise, for example, determining whether a transmission of the quantity of data using the first transmission state can be conducted without exceeding allowable transmission parameters as are specified by the applicable regulatory requirements.

This determination 102 can be carried out using any of a variety of techniques and/or data points. By one approach, the wireless transmitter can be provisioned with information regarding a set of regulatory requirements that are essentially presumed to apply (presuming a given transmission state). In addition, or in lieu thereof, the wireless transmitter can be configured and arranged to obtain some or all of the applicable regulatory requirements from a remote source (such as a server that maintains and provides such information upon request). By yet another approach, the wireless transmitter can be configured and arranged to ascertain its geographic location and hence a particular regulatory entity whose regulations are to be considered in this regard. For example, when in the United States the wireless transmitter could knowingly refer to regulations as promulgated by the U.S. Federal Communications Commission. When in Canada, however, this same wireless transmitter could instead knowingly refer to the regulations as have been promulgated by the corresponding agency in that country.

Figure 2:
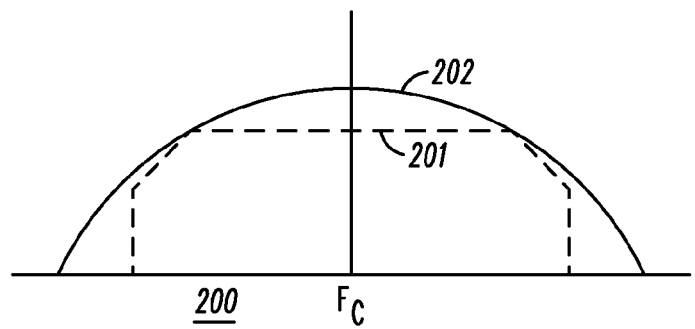
FIG. 2 comprises a spectral density diagram.

By one approach, such a determination 102 can be based, at least in part, upon a comparison of a calculated (or estimated) spectral density view of the first transmission state with a corresponding spectral density mask as represents the attending regulatory requirements. To illustrate, and referring momentarily to FIG. 2, the spectral density footprint 202 as will correspond to the transmission of the quantity of data using the first transmission state can be contrasted with a spectral density mask 201 as corresponds to the regulatory requirements as will apply to such a transmission. In the illustrated example, the proposed transmission exceeds the permissible mask 201 in all regards and hence would clearly violate the applicable regulatory requirements were such a transmission, in fact, to occur.

Spectral density views such as these can be provided using on-the-fly calculations if desired. It would also be possible, if desired, for the wireless transmitter to use one or more lookup tables to develop such information. In addition, or in lieu thereof, such a wireless transmitter could transmit the salient information to a remote resource that then uses that information to determine the corresponding spectral density information. The latter can then be returned to the wireless transmitter for use as described above. As yet one additional possibility in this regard, the wireless transmitter could simply transmit information regarding the quantity of data to such a remote resource. The latter could then make the described determination 102 using, for example, information from the wireless transmitter regarding the nature of the first transmission state and/or certain presumptions in that regard.

When such is not the case (i.e., when the quantity of data cannot be transmitted using the first transmission state in a manner that complies with the corresponding regulatory requirements), this process 100 can then provide for next automatically determining 103 whether the quantity of data can be transmitted using a second transmission state in a manner that complies with the regulatory requirements as will apply to such a second transmission state transmission but that will still offer a substantially comparable quality of service as a first transmission state transmission. By one approach this second transmission state is different from the first transmission state. This difference can be total and complete or can be partial as desired. As to the latter, and by way of illustration, by one approach, the second transmission state can comprise transmitting a portion of the quantity of data using the first transmission state and transmitting a remaining portion of the quantity of data using another transmission state that is different from the first transmission state.

These transmission states can vary from one another in any of a wide variety of ways. For example, these transmission states can differ from one another by at least one of a range of corresponding transmission frequencies; a bearer channel center frequency, a kind of modulation, a modulation parameter, transmission power, encryption, error detection, error correction, and so forth. Those skilled in the art will recognize and understand that such examples serve an illustrative purpose and are not intended to comprise an exhaustive listing in this regard.

These teachings can be employed with a variety of transmission states and their corresponding transmission platforms. By one approach, the wireless transmitter will comprise a transmission-agile wireless transmitter platform.

By one approach the second transmission state can accommodate a dis-aggregation of the quantity of data into at least two groups of data. The quantity of data can then be transmitted in this dis-aggregated form using a second transmission state that comprises two at least substantially temporally parallel transmission streams that differ from one another in one or more ways as described above.

Figure 3:
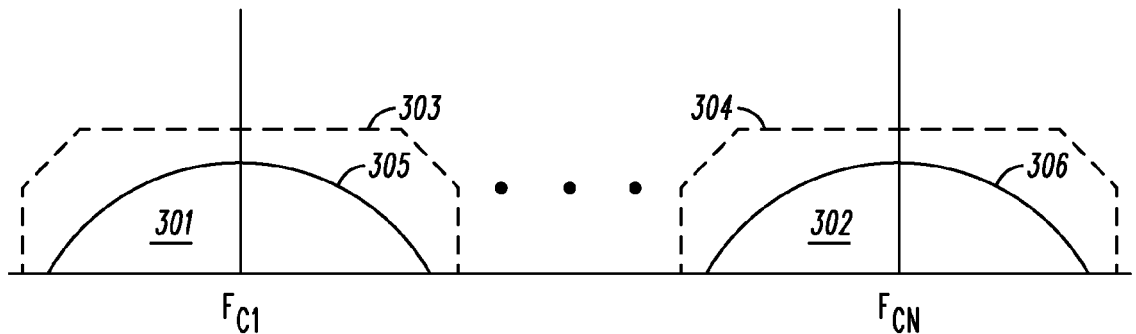
FIG. 3 comprises a spectral density diagram as configured in accordance with various embodiments of the invention.

To illustrate, the same comparison technique as was described above can be employed here to determine whether each such substantially temporally parallel transmission stream can be effected in a manner that complies with corresponding regulatory requirements. In particular, and referring momentarily to FIG. 3, a first such substantially temporally parallel transmission stream 301 can have a corresponding spectral density characteristic 305 while a second such substantially temporally parallel transmission stream 302 can similarly have a corresponding spectral density characteristic 306. Each such spectral density characteristic 305 and 306 can then be compared against a corresponding applicable regulatory requirement as manifested by a corresponding spectral density mask 303 and 304. In the example shown, both such substantially temporally parallel transmission streams 301 and 302 are found to be compliant in this regard.

It will be understood and appreciated that the regulatory requirements as apply to a first one of the substantially temporally parallel transmission streams may differ from the regulatory requirements as apply to other of the substantially temporally parallel transmission streams. In such a case, the corresponding regulatory requirements should be used as apply to each such stream. It is possible in some instances for one such stream to meet the stipulations of its corresponding regulatory requirements while another of the streams fails to meet its attending requirements. In such a case, when any one of the streams fails in this regard, the overall transmission state may be viewed as failing in this regard.

When the second transmission state is found to be compliant with all relevant regulatory requirements, this process 100 then provides for automatically transmitting 105 the quantity of data using the second transmission state. Those skilled in the art will recognize and understand that such a transmission serves to forward the quantity of data with a quality of service that is at least as good as would have been attained using the first transmission state (presuming that the second transmission state is selected with such a result in mind).

When such is not the case (i.e., when the process 100 determines 103 that the aforementioned transmission cannot occur in a manner that complies with all regulatory requirements as may apply to these substantially temporally parallel transmission streams), then process 100 can provide, if desired, for incrementally considering yet other possibilities in this regard. This can comprise, for example, further dis-aggregating the quantity of data over an incrementally increased 104 number of substantially temporally parallel transmission streams and repeating the aforementioned comparison with corresponding applicable regulatory requirements. Such a process can be repeated until a viable transmission configuration is identified of, if desired, until a predetermined number of iterations have been conducted.

Upon identifying a viable combination in this regard, this process 100 can then provide for automatically transmitting 105 the quantity of data using the corresponding transmission state.

It is possible, of course, for this process 100 to determine 102 that the first transmission state will, in fact, serve in a manner that is fully compliant with the relevant regulatory requirements. In such a case, this process 100 can provide for the automatic transmission 108 of the quantity of data using the first transmission state. Those skilled in the art will recognize, however, that the dis-aggregation process described above can also serve as a kind of security mechanism in that the data being transmitted cannot be fully gleaned by simply receiving a single one of the transmission streams. With this in mind, it is possible that, in some cases, it may be desirable to effectively force such a dis-aggregation approach to the transmission of the data.

To facilitate such a result, if desired, this process 100 will optionally provide for determining 106 whether the quantity of data to be transmitted is to intentionally be transmitted using a plurality of transmission states and, when true, providing for adding 107 additional content (such as spoof content, redundant data, increased error detection/correction content, and so forth) to the quantity of data such that the regulatory requirements as will apply to the first transmission state will not be met and the process 100 will proceed as described above to dis-aggregate the data over, for example, multiple transmission streams.

Figure 4:
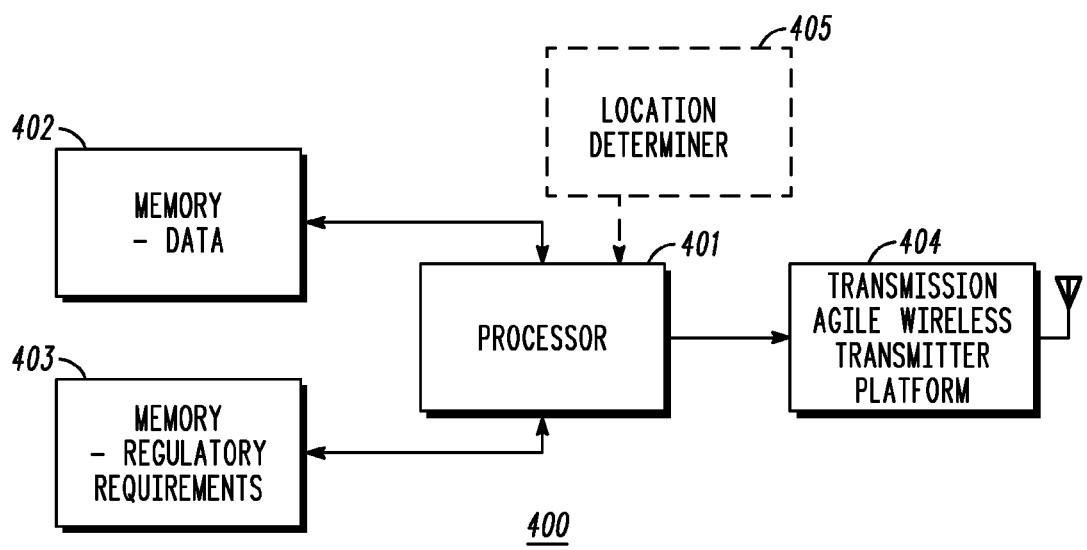
FIG. 4 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform will now be provided.

In this illustrative example, the wireless transmitter 400 comprises a processor 401. This processor 401 can comprise a partially or fully programmable platform that is configured and arranged (via, for example, corresponding programming as will be understood by those skilled in the art) to effect the teachings set forth herein. To facilitate matters, this processor 401 can operably couple to a first memory 402 that has the aforementioned quantity of data stored therein and to a second memory 403 that has information regarding regulatory requirements stored therein.

These teachings will further accommodate, if desired, optionally providing a location determiner 405 that also operably couples to the processor 401. Such a location determiner 405 can comprise any location determination platform (such as, for example, a global positional system receiver) as is presently known in the art or as may be developed hereafter. So configured, the processor 401 can identify particular applicable regulatory requirements as a function, at least in part, of a present location of the wireless transmitter 400.

As illustrated, the processor 401 also operably couples to a transmission agile wireless transmitter platform 404 of choice. Great flexibility exists in this regard as these teachings are readily applied in conjunction with any of a wide variety of choices in this regard. By one approach, this transmission agile wireless transmitter platform comprises a platform that is configured and arranged to be able to transmit a plurality of substantially temporally parallel transmission streams (such as two, three, four, or more such streams). Such platforms are known in the art and these teachings are not particularly sensitive to the selection of any particular choice in this regard. For all these reasons and further for the sake of brevity further elaboration regarding such platforms will not be provided here.

Those skilled in the art will recognize and understand that such an apparatus 400 may be comprised of a plurality of physically distinct elements as is suggested by the illustration shown in FIG. 4. It is also possible, however, to view this illustration as comprising a logical view, in which case one or more of these elements can be enabled and realized via a shared platform. It will also be understood that such a shared platform may comprise a wholly or at least partially programmable platform as are known in the art.

When transmitting dis-aggregated data as described herein, it will of course be helpful if the corresponding target receiver is able to compatibly receive such transmissions. By one illustrative approach, if desired, the transmitter can transmit a message to indicate that a quantity of data is going to be subsequently transmitted in dis-aggregated form over two (or more) at least substantially temporally parallel transmission streams that differ from one another in particular specified ways. Such information could comprise a coded representation that correlates to particular look-up table entries or could, if desired, comprise the characterizing information in full.

Figure 5:
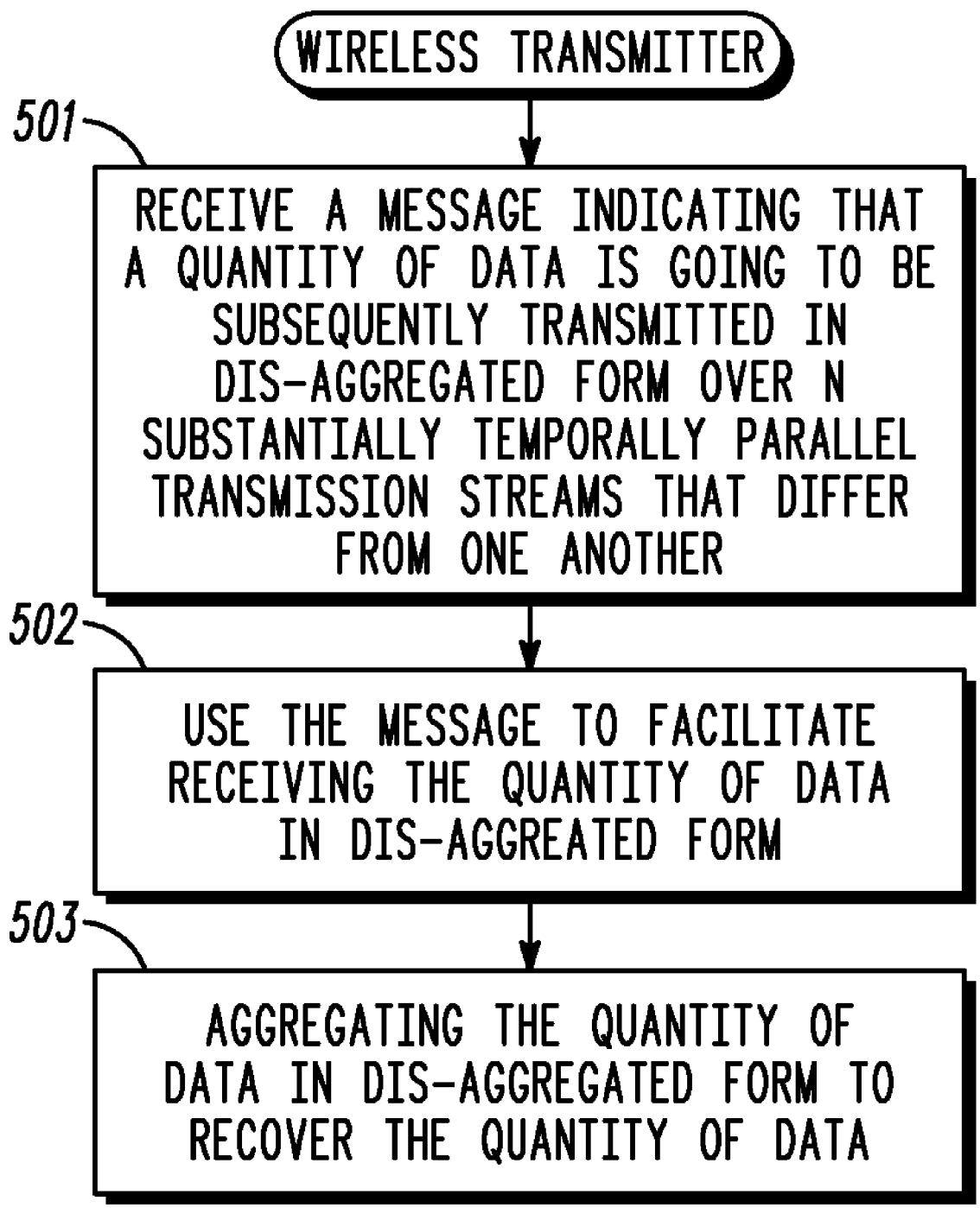
FIG. 5 comprises a flow diagram as configured in accordance with various embodiments of the invention.

In such a case, and referring now to FIG. 5, a corresponding wireless receiver process 500 can provide for receiving 501 such a message and then using 502 that message to facilitate receiving the quantity of data in dis-aggregated form (via, for example, reception of a corresponding plurality of substantially temporally parallel transmission streams). This process 500 can then provide for aggregating 503 the quantity of data from the received dis-aggregated data in order to thereby recover the quantity of data.

So configured, even a large quantity of data can be reliably transmitted in a manner that is both compatible with applicable regulatory requirements while also tending to ensure that an intended quality of service remains met and satisfied. These teachings are readily implemented and offer great flexibility with respect to scalability and alternative approaches.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    at a wireless transmitter:
        providing a quantity of data to be transmitted;
        automatically determining whether the quantity of data can be transmitted using a first transmission state in a manner that complies with regulatory requirements as will apply to such a first transmission state transmission;
        when the quantity of data can be transmitted using the first transmission state in a manner that complies with the regulatory requirements as will apply to such a first transmission state transmission, automatically transmitting the quantity of data using the first transmission state;
        when the quantity of data cannot be transmitted using the first transmission state in a manner that complies with the regulatory requirements as will apply to such a first transmission state transmission, automatically determining whether the quantity of data can be transmitted using a second transmission state in a manner that complies with regulatory requirements as will apply to such a second transmission state transmission but that will offer a substantially comparable quality of service as a first transmission state transmission, wherein the second transmission state is different at least in part from the first transmission state;
        when the quantity of data can be transmitted using the second transmission state in a manner that complies with the regulatory requirements as will apply to such a second transmission state transmission, automatically transmitting the quantity of data using the second transmission state;
        when the quantity of data cannot be transmitted using the second transmission state in a manner that complies with the regulatory requirements as will apply to such a second transmission state transmission, automatically determining whether the quantity of data can be transmitted using a third transmission state in a manner that complies with regulatory requirements as will apply to such a third transmission state transmission but that will offer a substantially comparable quality of service as the first transmission state transmission, wherein the third transmission state is different at least in part from the first transmission state and the second transmission state.

2. The method of claim 1 wherein automatically determining whether the quantity of data can be transmitted using a first transmission state in a manner that complies with regulatory requirements as will apply to such a first transmission state transmission comprises, at least in part, determining whether a transmission of the quantity of data using the first transmission state can be conducted without exceeding allowable transmission parameters as are specified by the regulatory requirements as will apply to such a first transmission state transmission.

3. The method of claim 1 wherein the second transmission state comprises:
    transmitting a portion of the quantity of data using the first transmission state;
    transmitting a remaining portion of the quantity of data using another transmission state that is different from the first transmission state.

4. The method of claim 3 wherein the another transmission state differs from the first transmission state by at least one of:
    a range of corresponding transmission frequencies;
    a bearer channel center frequency;
    a kind of modulation;
    a modulation parameter;
    transmission power;
    encryption;
    error detection;
    error correction.

5. The method of claim 1 wherein automatically determining whether the quantity of data can be transmitted using a first transmission state in a manner that complies with regulatory requirements as will apply to such a first transmission state transmission comprises, at least in part:
    determining spectral density as corresponds to a transmission of the quantity of data using the first transmission state;
    comparing the spectral density to an allowable mask as represents the regulatory requirements that will apply to such a first transmission state transmission.

6. The method of claim 1 further comprising:
    determining whether the quantity of data to be transmitted is to intentionally be transmitted using a plurality of transmission states;
    when the quantity of data is to be intentionally transmitted using a plurality of transmission states, adding additional content to the quantity of data such that the regulatory requirements as will apply to the first transmission state transmission will not be met.

7. The method of claim 1 wherein automatically determining whether the quantity of data can be transmitted using a first transmission state in a manner that complies with regulatory requirements as will apply to such a first transmission state transmission further comprises:
    determining presently applicable regulatory requirements.

8. The method of claim 7 wherein determining presently applicable regulatory requirements comprises, at least in part, automatically determining a present location of the wireless transmitter.

9. A method comprising:
    at a wireless transmitter:
        providing a quantity of data to be transmitted;
        automatically determining whether the quantity of data can be transmitted using a first transmission state in a manner that complies with regulatory requirements as will apply to such a first transmission state transmission;
        when the quantity of data can be transmitted using the first transmission state in a manner that complies with the regulatory requirements as will apply to such a first transmission state transmission, automatically transmitting the quantity of data using the first transmission state;
        when the quantity of data cannot be transmitted using the first transmission state in a manner that complies with the regulatory requirements as will apply to such a first transmission state transmission, automatically determining whether the quantity of data can be transmitted using a second transmission state in a manner that complies with regulatory requirements as will apply to such a second transmission state transmission but that will offer a substantially comparable quality of service as a first transmission state transmission, wherein the second transmission state is different at least in part from the first transmission state;
        when the quantity of data can be transmitted using the second transmission state in a manner that complies with the regulatory requirements as will apply to such a second transmission state transmission, automatically transmitting the quantity of data using the second transmission state;

when the quantity of data cannot be transmitted using the second transmission state in a manner that complies with the regulatory requirements as will apply to such a second transmission state transmission, automatically and iteratively determining whether applicable regulatory requirements can be satisfied when transmitting an iteratively increased number of differing transmission states to transmit correspondingly increasingly dis-aggregated data but that will offer a substantially comparable quality of service as the first transmission state transmission until the applicable regulatory requirements are met by a particular selection of transmission states, and then using those corresponding transmission states to transmit the quantity of data.

* * * * *